United States Patent

[11] 3,576,440

| [72] | Inventors | Robert E. Jehle<br>Woodhaven, N.Y.;<br>David P. Helm, Alexandria, Va. |
|---|---|---|
| [21] | Appl. No. | 816,182 |
| [22] | Filed | Apr. 10, 1969 |
| [45] | Patented | Apr. 27, 1971 |
| [73] | Assignee | The United States of America as represented by the Secretary of the Navy |

[54] PULSE CIRCUIT FOR RADIAC SETS
6 Claims, 4 Drawing Figs.

[52] U.S. Cl. .................................................. 250/83.6, 307/308
[51] Int. Cl. ........................................................ G01t 1/18
[50] Field of Search ............................................ 250/83.6, 83.6 (P), 83.3, 83 (C); 307/308; 328/1

[56] References Cited
UNITED STATES PATENTS

| 2,672,561 | 3/1954 | Lichtman | 250/83.6 |
| 2,824,237 | 2/1958 | Witzel et al. | 250/83.6 |
| 2,876,360 | 3/1959 | Victoreen | 250/83.6 |
| 3,012,140 | 12/1961 | Pellissier et al. | 250/51.5 |
| 3,319,066 | 5/1967 | Gernert | 250/83.6 |
| 3,366,791 | 1/1968 | Markow | 250/83.6 |

Primary Examiner—James W. Lawrence
Assistant Examiner—Davis L. Willis
Attorneys—Louis A. Miller, Louis B. Applebaum and Ernest F. Weinberger ABSTRACT: In a G.M. radiac set which has a multivibrator meter circuit having an ammeter between the bistable switchable elements, a pulse generator for providing a periodic feed through pulse to the G.M. tube. The feed through pulse is added to a tube pulse only when they occur simultaneously, to provide a high amplitude counting pulse for the meter circuit.

Patented April 27, 1971

INVENTORS.
ROBERT E. JEHLE
DAVID P. HELM

BY Ernest J Weinberger

ATTORNEYS

INVENTORS.
ROBERT E. JEHLE
DAVID P. HELM
BY
Ernest J Weinberger
ATTORNEYS 3,576,440

PULSE CIRCUIT FOR RADIAC SETS

The invention described herein may be manufactured and used by or for the Government of the United States of America for governmental purposes without the payment of any royalties thereon or therefor.

BACKGROUND OF THE INVENTION

The present invention relates to Geiger-Muller tube Radiac Sets and more particularly pertains to meter circuits and counting circuits wherein an indication is present in a saturation field which would ordinarily not provide an off-scale deflection.

DESCRIPTION OF THE PRIOR ART

In the field of radiation measurements employing a Radiac set, it has been the general practice to employ standard metering or counting circuits which are of the multivibrator type and result in zero deflection under the influence of high radiation fields. This is due to the fact that the high radiation field increases the number of G.M. pulses but substantially reduces their amplitude to a point where the metering circuit is incapable of counting them. These instruments have been unsatisfactory in that the user of such Radiac Sets could expose himself to extremely dangerous radiation while being totally unaware of the danger. The present invention obviates this unsafe condition.

SUMMARY OF THE INVENTION

The general purpose of this invention is to provide an improved radiation measuring instrument that has all the advantages of similarly employed prior art devices and has none of the disadvantages. To attain this, the present invention provides a pulse generator whose recurrent pulses are applied to a Geiger-Muller tube simultaneously with the application of a large DC potential across the tube. In a high radiation field, the probability of coincidence between the recurrent pulses and the G.M. pulses increases, and the resulting output pulses, due to saturation, will be of sufficient amplitude to trigger the multivibrator metering circuit.

An object of the present invention is to provide a simple, inexpensive, reliable and safe Radiac Set which will indicate the presence of a saturated radiation field.

Another object is to provide an improved circuit for use with the presently employed Geiger-Muller tube radiacs which will extend their range of detection, thereby providing an additional safety factor for the operator.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
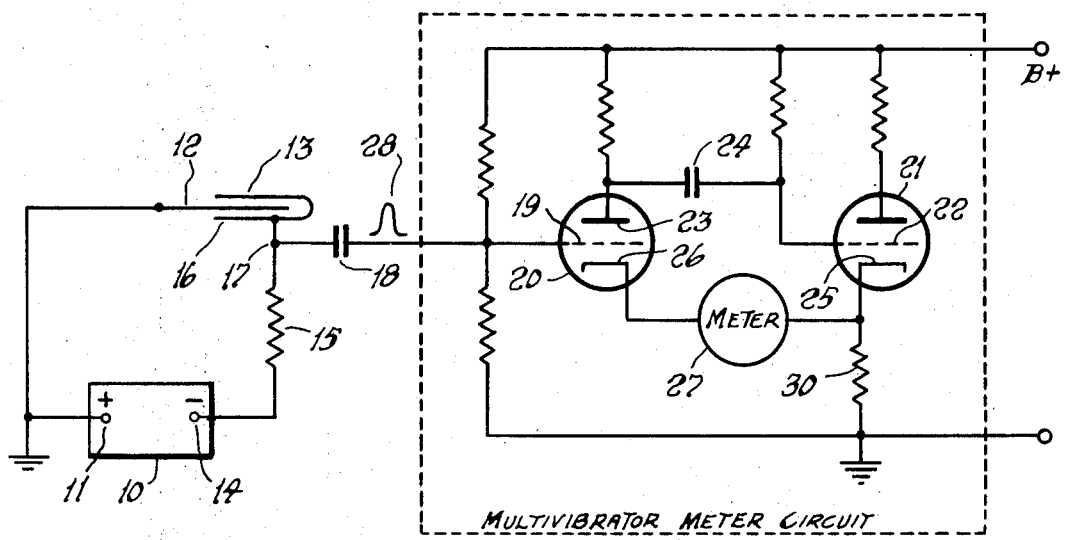
FIG. 1 is a representative diagram of a typical Radiac, G.M. and metering circuit.

In the illustrated embodiment of FIG. 1, which represents a typical Geiger-Muller Radiac, a source 10 of high voltage has its positive terminal 11 connected to the anode 12 of a Geiger-Muller tube 13. The negative terminal 14 thereof is connected through resistor 15 to the cathode 16. The output terminal 17 is connected via input capacitor 18 to the grid 19 of tube 20. The grid 22 of tube 21 is tied to the plate 23 of tube 20 via capacitor 24 while the cathodes 25 and 26 are directly connected through ammeter 27. In operation tube 21 is normally biased "on" while tube 20 is "off." When a particle enters the G.M. tube it causes ionization therein due to the high potential applied thereacross and produces an output pulse as at 28 across the resistor 15. When this pulse is applied at grid 19 it causes the multivibrator 29 to momentarily switch or reverse with tube 21 "off" and 20 "on." This reversal results in a small current passing between the cathodes which produces a deflection at the meter 27. The cathode voltage across resistor 30 then returns the tubes to their normal state, ready for the next G.M. pulse. As the G.M. tube fires more rapidly the number of pulses increases with an accompanying decrease in their amplitude until saturation occurs when they are too low to cause any deflection of the meter. Thus, the most hazardous environment, namely, a saturated radiation field, is not indicated.

Figure 2:
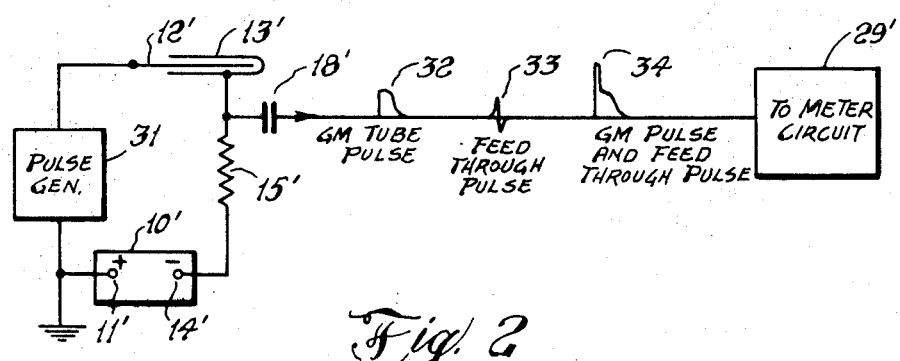
FIG. 2 is a representation of an embodiment made in accordance with the principle of this invention, illustrating the output pulses from the G.M. tube.

Referring now to FIG. 2 wherein the G.M. tube portion of the circuit has been illustrated, a pulse generator 31 has been interposed between the anode 12' and the positive terminal 11' of the source 10'. The pulse generator recurrently supplies a relative short pulse of high amplitude, as for example, 180 volts for 10 microseconds at a selected repetition rate. Clearly these three parameters can be selected in conformance with the particular G.M. tube and supply. With the G.M. tube exposed to radiation two time related possibilities exist. Either the G.M. tube (radiation) pulse and the generator pulse occur in sequence or they occur in coincidence. The G.M. tube pulse generated by the ionization produces an output pulse as at 32 and results in a meter count. The pulse generator output or added pulse is effectively applied across the G.M. tube and the resistor 15 in series. Since this pulse is insufficient to ionize the tube and the impedance thereacross is high (small capacitance), most of this pulse voltage is across the tube (anode-cathode) and very little across the resistor 15'. The voltage across the resistor or "feed thru pulse" is represented at 33 and is of such a small amplitude as not to trigger the multivibrator meter circuit 29'. It is therefore obvious that under normal operating conditions, the introduction of the additional pulse, in no manner changes or alters the overall response of the device. Considering now the other condition namely, when the pulses are coincident, the G.M. tube is caused to "fire" and in so doing its impedance drops appreciably. Thus, the generator pulse appears almost entirely across the resistor and is added to the G.M. "firing" pulse as at 34. This combined pulse is sufficient to positively trigger the multivibrator even at a high repetition rate. Clearly, where the radiation is below saturation the coincidence rate would not alter the meter deflection since approximately all the G.M. firing pulses would be counted. In a high radiation field (saturation) the probability of coincidence is substantially increased and the combined pulses would be sufficient in number to keep the meter "off" scale and provide a warning.

Figure 3:
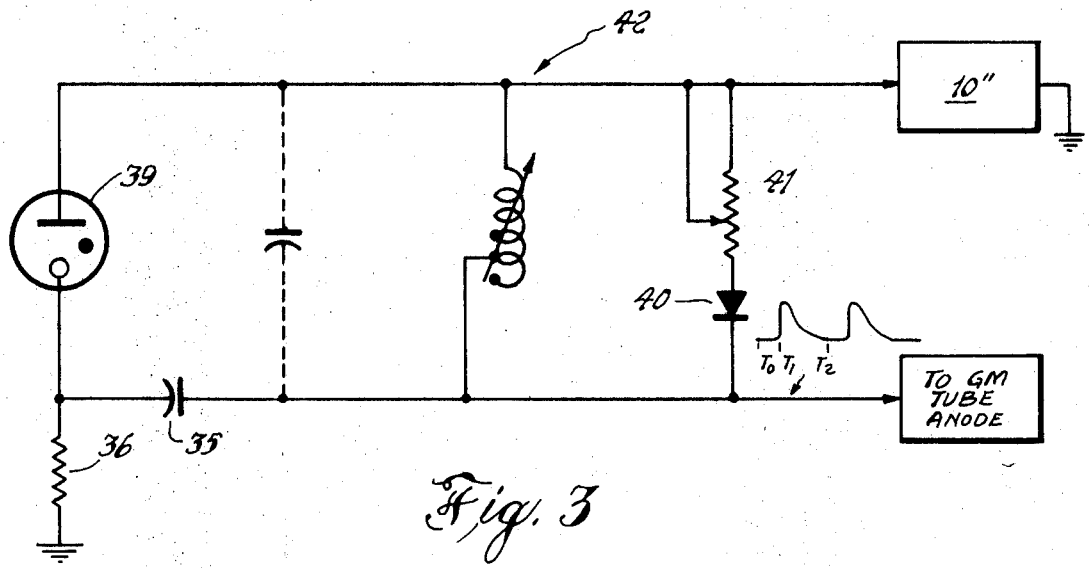
FIG. 3 is a schematic of a pulse generator which may be used with the G.M. tube.

FIG. 3 illustrates one suitable form of pulse generator 42 which employs a gas diode and functions as a relaxation oscillator. Assuming initially that coupling capacitor 35 has charged exponentially through resistor 36 and inductor 37 from the positive terminal of a high voltage source 38 to a potential where the gas diode 39 is about to breakdown. At this point the voltage at the anode of the G.M. tube is approximately 400 volts. At this instant, namely $T_o$, the voltage across the storage inductor 37 and the distributed capacity $C_x$ is zero. Immediately thereafter the gas diode 39 breaks down to a "glow" voltage of approximately 100 volts. The current through the G.M. tube which consists primarily of the charging current of $C_x$ reaches a maximum value between times $T_o$ and $T_1$. At time $T_1$ this current is no longer sufficient to maintain ionization while at the same time $C_x$ is fully charged to 190 volts by the discharge current generated in capacitor dropping from 400 to 300 volts. The extremely fast rise time ($T_o$ to $T_1$) results in the current through inductor 37 remaining to deionize at $T_1$, $C_x$ is charged to 140 volts. $C_x$ then discharges through inductor 37 during the period $T_1$ to $T_2$ and diode 40 limits the voltage overshoot and prevents ringing. Excessive loading of the tuned circuit is prevented by the series circuit of diode 40 and resistor 41. The entire cycle is thereafter repeated to provide a recurrent series of pulses. By varying the inductance and the resistor 41 the pulse width and repetition can be selected.

Figure 4:
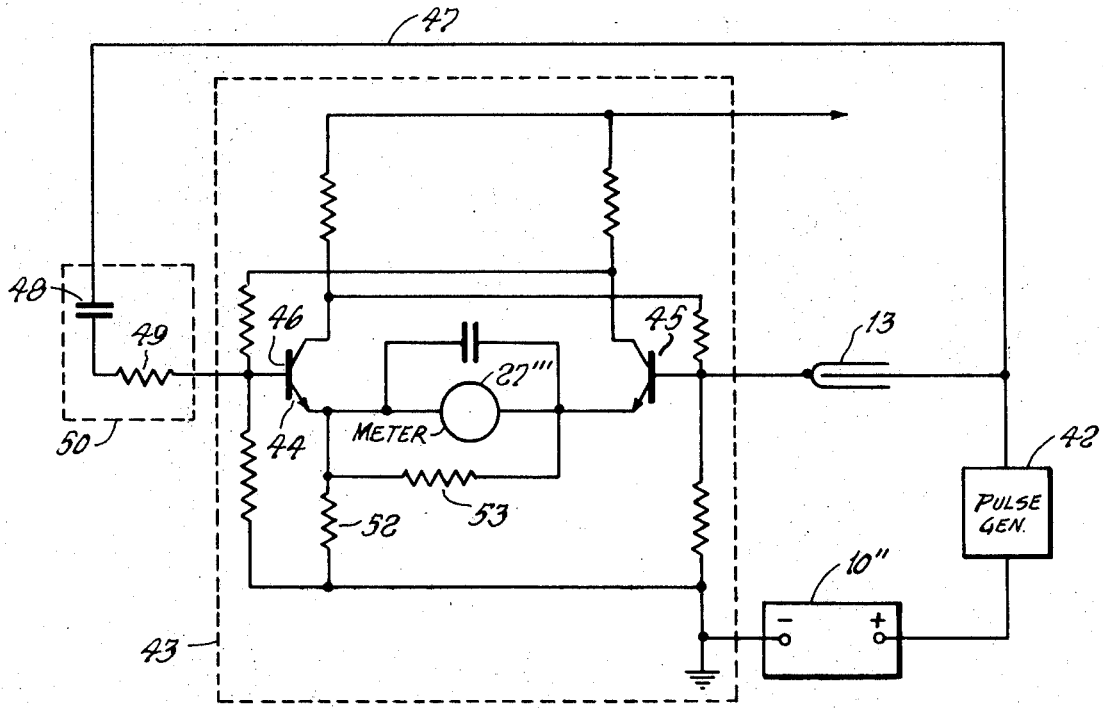
FIG. 4 is another embodiment made in accordance with the principle of this invention.

In the embodiment of FIG. 4 wherein a binary indicator circuit 43, the bistable multivibrator circuit in the form of a binary-indicator consists essentially of a pair of transistors 44 and 45 connected in circuit such that when either is conducting the flip-flop must be initiated by an input trigger pulse. Positive pulses from the cathode of gas diode 39 (see FIG. 3) of the generator 42''' are fed to the base 46 of transistor 44 via line 47, capacitor 48 and input resistor 49 which serve as a pulse-shaping network 50. This pulse causes transistor 44 to conduct and thereby cuts off transistor 45. If at a short time thereafter the G.M. tube fires, the pulse therefrom at base 51 of transistor reverses the transistors to their original state and this reversal produces a detection current through the meter 27''''. The pulse generator 42''' also provides the added pulse to cause deflection in a saturation field. The small nominal voltage drop across resistor 52 in the common emitter current pulse is fed through the meter. The current "read" by the meter is a function of the radiation field intensity. Variable resistor 53 controls the proportion of the current flowing through the meter.

It is quite clear that the above could have been accomplished without the introduction of a reset pulse at the base 46 by substituting another type of multivibrator. This embodiment, however, provides a simple and direct calibration technique. In prior methods the practice was to place the radiac set in a standard radiation field and adjust the width of the enabling pulse applied to the G.M. tube to a value that would cause the G.M. tube to fire 80 percent of the time, that is, if 1,000 enabling pulse were placed across the G.M. tube and the tube was in a standard radiation field the G.M. tube would produce 800 pulses. The meter current of the radiac set was then adjusted for a full scale deflection. This is known as setting the radiac set for 80 percent coincidence. To know when 80 percent coincidence was arrived at, the operator would have to have an electronic counting circuit to count the number of enabling pulses per second produced by the internal oscillator circuit, then he would adjust the pulse width of the enabling pulse until the G.M. tube "fired" 80 percent of the enabling pulse repetition rate. In order to expedite calibration, an oscilloscope was also used to measure the width of the enabling pulse as it was adjusted. The entire procedure takes 10 to 20 minutes of adjusting and measuring and it requires an electronic counter and an oscilloscope.

The instant technique converts the radiac set into a pulse repetition rate meter and then back into a radiac set. It is done in this fashion. The radiac set is placed in a field so high that every time the enabling pulse is applied to the G.M. tube the G.M. tube "fires." This represents 100 percent coincidence. The meter resistance is adjusted so that the meter reads full scale; the set is now a pulse repetition rate meter. The set is brought into a known field and the enabling pulse width is adjusted until a deflection of 80 percent is indicated by the meter; this represents 80 percent coincidence. The meter resistance is now changed to read full scale and the set is now calibrated to read radiation. This method of calibrating takes about 2 to 3 minutes.

We claim:

1. A radiac set comprising:
    a Geiger-Muller tube having a cathode and an anode,
    a source of high voltage,
    a first resistor,
    a source of repetitive periodic pulses having an output terminal,
    first electrical means connecting in series said resistor, said voltage source, said pulse source, said anode, and said cathode,
    means for indicating the number of pulses per time whose amplitude is in excess of the amplitude of said periodic pulses, and having an input terminal and an indicator, and
    second electrical means connecting said cathode to said input terminal.

2. The radiac set according to claim 1 wherein said means for indicating is a multivibrator having a meter for detecting the switching thereof.

3. The radiac set according to claim 2 wherein said source of repetitive pulses is a relaxation oscillator.

4. The radiac set according to claim 1 wherein said means for indicating is a binary-indicator circuit having a pair of bistable switchable elements.

5. The radiac set according to claim 4 further including third electrical means connecting said output terminal of said pulse source and said binary-indicator circuit for providing a reset signal thereto.

6. The radiac set according to claim 5 further including a pulse shaper interposed between said binary-indicator circuit and said output terminal of said pulse source.